(12) United States Patent
Pritchard et al.

(10) Patent No.: US 11,785,015 B2
(45) Date of Patent: Oct. 10, 2023

(54) INFORMATION SECURITY SYSTEM FOR DETECTING UNAUTHORIZED ACCESS REQUESTS

(71) Applicant: Bank of America Corporation, Charlotte, NC (US)

(72) Inventors: David Pritchard, England (GB); Matthew Peach, England (GB); Swapnil S. Palkar, England (GB); Rajesh M. Gopinathapai, Aurora, IL (US)

(73) Assignee: Bank of America Corporation, Charlotte, NC (US)

( * ) Notice: Subject to any disclaimer, the term of this patent is extended or adjusted under 35 U.S.C. 154(b) by 198 days.

(21) Appl. No.: 17/183,480

(22) Filed: Feb. 24, 2021

(65) Prior Publication Data

US 2022/0272094 A1   Aug. 25, 2022

(51) Int. Cl.
*H04L 29/00* (2006.01)
*H04L 9/40* (2022.01)

(52) U.S. Cl.
CPC .......... *H04L 63/102* (2013.01); *H04L 63/107* (2013.01); *H04L 63/20* (2013.01)

(58) Field of Classification Search
CPC ...... H04L 63/102; H04L 63/107; H04L 63/20
See application file for complete search history.

(56) References Cited

U.S. PATENT DOCUMENTS

| | | | |
|---|---|---|---|
| 7,451,439 B2 | 11/2008 | Nickell et al. | |
| 7,996,374 B1 * | 8/2011 | Jones ...................... | H04L 63/20 707/694 |
| 8,074,256 B2 * | 12/2011 | Valente ............... | H04L 41/0266 709/224 |
| 8,265,916 B1 | 9/2012 | Portal et al. | |
| 8,271,541 B2 | 9/2012 | Mohan et al. | |
| 8,352,914 B2 | 1/2013 | Sarkar et al. | |
| 8,402,317 B1 | 3/2013 | Portal et al. | |
| 8,413,108 B2 | 4/2013 | Groves et al. | |
| 8,561,021 B2 | 10/2013 | Muharsky et al. | |
| 8,601,441 B2 | 12/2013 | Kaulgud et al. | |
| 8,756,698 B2 | 6/2014 | Sidagni | |
| 8,776,007 B2 | 7/2014 | Bijani et al. | |
| 8,813,235 B2 | 8/2014 | Sidagni | |
| 8,949,796 B2 | 2/2015 | Howard | |
| 9,116,899 B2 | 8/2015 | Cullen et al. | |
| 9,135,591 B1 | 9/2015 | Nicol et al. | |
| 9,158,503 B2 | 10/2015 | Misbhauddin et al. | |
| 9,235,494 B2 | 1/2016 | Gautam | |
| 9,317,408 B2 | 4/2016 | Szpak | |
| 9,411,557 B1 | 8/2016 | Cartey et al. | |
| 9,420,002 B1 * | 8/2016 | McGovern ............. | H04L 63/20 |
| 9,424,426 B2 | 8/2016 | Payne et al. | |
| 9,489,290 B1 | 11/2016 | Boissy et al. | |

(Continued)

*Primary Examiner* — Don G Zhao

(57) ABSTRACT

A system for verifying a user's request to access a resource determines a set of entitlement attributes from the request. The set of entitlement requests indicates a type of permission to access a particular resource, including at least one of a write-access and a read-access to the particular resource. The system determines whether there is any rule that is violated by the set of entitlement attributes. In response to determining that there is at least one rule that is violated by the set of entitlement attributes, the system denies the request.

20 Claims, 3 Drawing Sheets

(56) References Cited

U.S. PATENT DOCUMENTS

| | | |
|---|---|---|
| 9,767,001 B2 | 9/2017 | Wong et al. |
| 9,813,285 B1 * | 11/2017 | McGovern ............ G06F 21/316 |
| 9,892,262 B2 | 2/2018 | Schmitt |
| 10,095,602 B2 | 10/2018 | Gautam et al. |
| 10,162,610 B2 | 12/2018 | Apte et al. |
| 10,198,507 B2 | 2/2019 | Pawar et al. |
| 10,261,781 B2 | 4/2019 | Balasubramanian et al. |
| 10,387,585 B2 | 8/2019 | Gangadhar et al. |
| 10,614,226 B2 | 4/2020 | Childress et al. |
| 10,637,826 B1 * | 4/2020 | Luo ...................... G06K 9/6276 |
| 10,698,683 B2 | 6/2020 | Craig et al. |
| 10,776,498 B2 | 9/2020 | Wasiq et al. |
| 10,809,984 B2 | 10/2020 | Mizrahi et al. |
| 11,044,256 B1 * | 6/2021 | Soby .................. G06F 16/2379 |
| 11,140,061 B1 * | 10/2021 | Sanders ............... G06F 21/577 |
| 2003/0200412 A1 * | 10/2003 | Peinado ............... G06F 12/145 |
| | | 711/202 |
| 2004/0186809 A1 | 9/2004 | Schlesinger et al. |
| 2004/0186836 A1 | 9/2004 | Schlesinger |
| 2006/0241909 A1 | 10/2006 | Morgan et al. |
| 2007/0006160 A1 | 1/2007 | Kunz et al. |
| 2007/0016394 A1 | 1/2007 | Gaudette |
| 2007/0050362 A1 * | 3/2007 | Low .................... G06F 21/6245 |
| 2007/0143196 A1 * | 6/2007 | Colvin ................. G06Q 20/108 |
| | | 705/35 |
| 2007/0168914 A1 | 7/2007 | Reddy |
| 2007/0180455 A1 | 8/2007 | Mariani |
| 2007/0220486 A1 | 9/2007 | Lammel et al. |
| 2007/0250508 A1 | 10/2007 | Oxenstierna et al. |
| 2009/0328132 A1 | 12/2009 | Renfro et al. |
| 2010/0162215 A1 | 6/2010 | Purcell |
| 2010/0199355 A1 | 8/2010 | Ouddan |
| 2011/0252395 A1 | 10/2011 | Charisius et al. |
| 2012/0240192 A1 | 9/2012 | Orazi et al. |
| 2013/0227533 A1 | 8/2013 | Tonkin et al. |
| 2014/0108937 A1 * | 4/2014 | Datla .................. H04L 41/0893 |
| | | 715/735 |
| 2014/0282373 A1 | 9/2014 | Garza |
| 2014/0282831 A1 | 9/2014 | Pedroza et al. |
| 2015/0072775 A1 * | 3/2015 | McDonald .......... G07F 17/3241 |
| | | 463/29 |
| 2015/0095890 A1 | 4/2015 | StClair et al. |
| 2015/0180894 A1 * | 6/2015 | Sadovsky ............. H04W 12/12 |
| | | 726/22 |
| 2015/0227866 A1 * | 8/2015 | Commare .......... G06Q 10/0631 |
| | | 705/7.12 |
| 2015/0363192 A1 | 12/2015 | Sturtevant |
| 2017/0061462 A1 * | 3/2017 | Bhalgat ............. G06Q 30/0275 |
| 2018/0077189 A1 * | 3/2018 | Doppke .................. H04L 63/20 |
| 2018/0349179 A1 * | 12/2018 | Worboys ........... G06Q 10/0631 |
| 2019/0220607 A1 * | 7/2019 | Dodor ..................... G06F 16/27 |
| 2019/0238424 A1 * | 8/2019 | Guan ................... H04L 41/5041 |
| 2019/0238427 A1 * | 8/2019 | Guan .................... H04L 67/535 |
| 2019/0238428 A1 * | 8/2019 | Guan ..................... H04L 43/10 |
| 2019/0238467 A1 * | 8/2019 | Guan ................... H04L 43/0882 |
| 2020/0021620 A1 * | 1/2020 | Purathepparambil ........................ H04L 63/102 |
| 2020/0034528 A1 * | 1/2020 | Yang ................... G06F 21/6209 |
| 2020/0364727 A1 * | 11/2020 | Scott-Green ....... G06Q 10/0635 |
| 2021/0029171 A1 * | 1/2021 | Barday ............... H04L 63/0414 |
| 2021/0075794 A1 * | 3/2021 | Gazit ................. H04L 63/1408 |

* cited by examiner

INFORMATION SECURITY SYSTEM FOR DETECTING UNAUTHORIZED ACCESS REQUESTS

TECHNICAL FIELD

The present disclosure relates generally to information security, and more specifically to an information security system for detecting unauthorized access requests.

BACKGROUND

It is challenging to monitor and control access rights of employees to various resources within an organization having a large number of employees and complex computer systems. As an employee joins, leaves, or moves throughout the organization, access rights of the employee to various resources may need to be updated, e.g., to add, remove, or modify access rights. Furthermore, periodic access reviews may need to be performed to ensure that access rights for employees do not exceed the scope of their authority. In other words, access reviews may be used to determine whether employees can access only those resources necessary to perform their job duties. Moreover, it may also be important to ensure that employees are not provided with incompatible access rights—combinations of access rights that would allow employees to carry out incompatible tasks. Reviewing such a large volume of access rights on a regular basis may strain the available resources of the organization. Current information security technologies may not be configured to provide a reliable and efficient solution for monitoring and controlling access rights of employees. Furthermore, the current information security technologies may not be configured to detect unauthorized access requests from the employees.

SUMMARY

Current information security technologies may not be configured to detect unauthorized requests to access resources. This disclosure contemplates systems and methods for detecting unauthorized requests to access resources. The resources may include applications, databases, and computing devices within an organization. Within an organization, a plurality of rules is put in place to indicate which users are authorized to gain access to one or more particular resources by being granted entitlements or permissions to use those resources. Similarly, the plurality of rules includes rules that indicate which users are not authorized to gain access to one or more particular resources.

Each rule is defined by a set of rule attributes that indicates conditions that need to be met by a user (or a group of users) so that the user (or the group of users) may be determined to be eligible to gain access to a particular resource. The set of rule attributes associated with a particular rule provides information about a user and a resource that the particular rule indicates whether the user is authorized (or not authorized) to access. For example, the set of rule attributes may include information indicating 1) an employment status of the user, 2) a position of the user in the organizational hierarchy, 3) authority level of the user, 4) a particular technology that the resource provides (e.g., information security-related, web development-related, etc.), 5) an identification indicator identifying the resource (e.g., a resource ID, a resource name), 6) a type of access permission (e.g., read-access, write-access, privileged-access, access to confidential information), etc. For example, a rule may indicate that mid-level web developer employees are not authorized to access resources (e.g., databases, computing devices, applications) used for accounting.

The entitlements are access rights or permissions provisioned to users to access one or more particular resources according to roles or positions of the users in the organization. Each entitlement is defined by a set of entitlement attributes that provides information about a user and a resource that the user is provisioned permission to access. The set of entitlement attributes associated with an entitlement provides information about a user and a resource that the user has access to. For example, the set of entitlement attributes may provide similar information as the set of rule attributes enumerated above.

By analyzing the rules, the disclosed system is configured to generate attribute-to-rule mapping tables in which the rules are classified into different condition classes with respect to various rule attributes. For example, assume that a first attribute-to-rule mapping table is related to a first rule attribute that indicates the employment status of users. In this example, the disclosed system classifies a first set of rules that are defined for active employees into a first condition class and a second set of rules that are defined for terminated employees into a second condition class. In a similar manner, the disclosed system generates other attribute-to-rule mapping tables that are related to other rule attributes and classifies the rules in their respective condition classes accordingly.

The disclosed system uses the attribute-to-rule mapping tables for detecting unauthorized access requests, and verifying users' requests for accessing resources. For example, assume that the disclosed system receives a request from a user to receive an entitlement to access a resource. From the request, the disclosed system determines a set of entitlement attributes, where the set of entitlement attributes include information about the requester (e.g., the employment status, position in the organizational hierarchy, etc.) and the resource (e.g., resource ID, technology field, type of requested permission, etc.) that the user is requesting to gain access to.

For each entitlement attribute, the disclosed system determines whether there is any rule that has a condition or rule attribute that corresponds to the entitlement attribute. For example, assuming that the request includes an entitlement attribute that indicates that the requester (i.e., the user) is an active employee, the disclosed system determines whether there is any rule that has a condition or rule attribute for active employees. If so, the discloses system filters the rules down to those rules that are defined for active employees. The disclosed system performs a similar procedure for other entitlement attributes to determine whether there is any rule whose conditions or rule attributes correspond to at least one entitlement attribute extracted from the request. If it is determined that there is at least one rule whose conditions or rule attributes correspond to the entitlement attributes extracted from the request, the disclosed system determines that the request violates the at least one rule, and denies the request.

In a particular example, assume that the user is a web developer at an organization, and is requesting to receive an entitlement to gain access to a particular resource (e.g., a database, a server, or an application) that is used for accounting. In this particular example, the disclosed system analyzes the attribute-to-rule mapping tables and determines whether there is any rule with conditions or rule attributes that indicate web developer employees are eligible to access the particular resource. In this particular example, the disclosed system determines that there is at least one rule that indicates web developer employees are not eligible to access the particular resource used for accounting. Thus, the disclosed system denies the request.

By leveraging the attribute-to-rule mapping tables in which the rules are classified based on their respective rule attributes, the disclosed system is able to verify the request in one loop because the disclosed system searches for corresponding rule attributes as the entitlement attributes extracted from the request, rather than searching through all the rules. As such, the disclosed system can determine whether the request violates any rule in a "one-step" or "one-loop" operation. In other words, the disclosed system does not need to compare or cross-reference each entitlement attribute of the requested entitlement with every rule attribute of every rule. Rather, the disclosed system, by leveraging the attribute-to-rule mapping tables, can determine and filter rules that have conditions related to each entitlement attribute in one-loop operation. In this way, the cyclomatic complexity of this process can be reduced to Order of (n) or O(n), where n is the number of components of entitlement attributes extracted from the request.

In one embodiment, a system for verifying a user's request to access a resource comprises a memory and a processor. The memory is operable to store a plurality of rules to be satisfied in order to gain access to a plurality of resources. The plurality of resources comprises at least one of an application, a database, and a computing device associated with an organization. Each rule from the plurality of rules comprises a set of rule attributes indicating conditions to be met by a user so that the user is determined to be eligible to receive an entitlement to access a resource from the plurality of resources. The processor is operably coupled with the memory. The processor is configured to receive, from a user, a request to receive an entitlement to access a particular resource from the plurality of resources. The processor determines, from the request, a set of entitlement attributes associated with the requested entitlement indicating a type of permission to access the particular resource. The type of permission comprises at least one of a write-access and a read-access to the particular resource. The processor determines whether there is any rule from the plurality of rules that is violated by the set of entitlement attributes. In response to determining that there is at least one rule that is violated by the set of entitlement attributes, the processor denies the request.

The disclosed systems provide several practical applications and technical advantages which include: 1) technology that detects whether a request to access a resource violates any of the rules that are put in place to prevent unauthorized users from gaining access to resources that they are not authorized to access; 2) technology that generates attribute-to-rule mapping tables in which the rules are classified into their respective condition classes that are related to conditions of the rules; 3) technology that improves the cyclomatic complexity of the processes of verifying a request to access a resource and detecting violations in entitlements granted to users, such that each of these processes is performed in "one step" or "one loop," so that the disclosed system does not need to compare each entitlement attribute of the entitlement against every rule attribute of every rule.

As such, the systems described in this disclosure may improve the information security and access request validation technologies by detecting unauthorized access requests from unauthorized users, and denying the unauthorized access requests. The disclosed system may be integrated into a practical application of reducing the computational complexity of the process of detecting the unauthorized access requests by generating the attribute-to-rule mapping tables and using them to search for rules that may be violated if an access request is granted in a one-loop operation.

This, in turn, provides an additional practical application of improving underlying operations of computing systems that are used to perform the process of detecting unauthorized access requests. For example, the disclosed system reduces processing, memory, and time resources that would otherwise be spent for detecting unauthorized access requests using the current information security and access request validation technologies. Furthermore, the disclosed system may be integrated into an additional practical application of securing resources that unauthorized users are not allowed to gain access to, and thus, improving underlying operations of those resources. Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
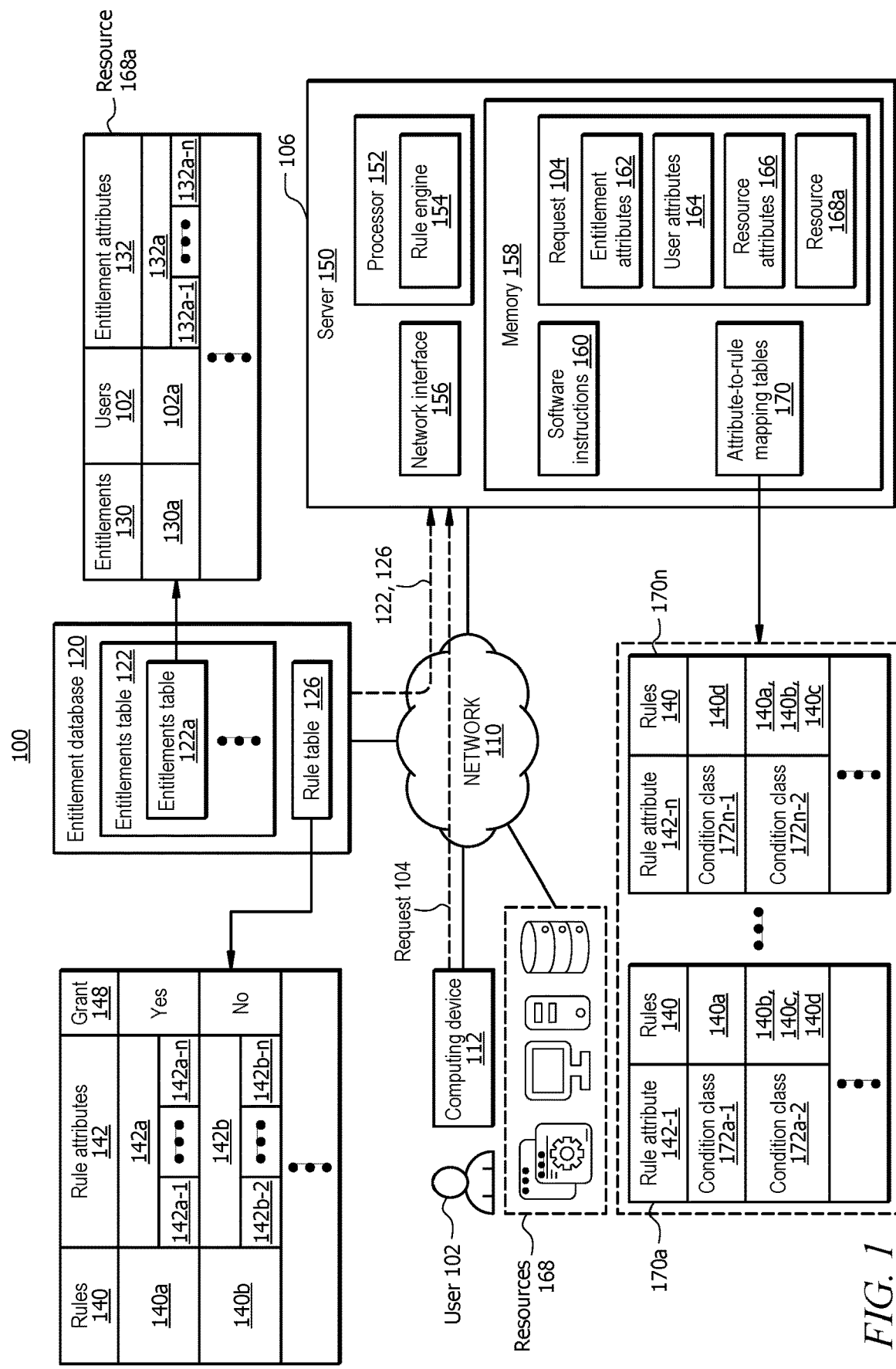
FIG. 1 illustrates an embodiment of a system configured to verify access requests.

FIG. 1 illustrates one embodiment of a system 100 that is configured to detect unauthorized requests 104 to access resources 168. In one embodiment, system 100 comprises a server 150 and an entitlement database 120. In some embodiments, system 100 further comprises a computing device 112 and a network 110 that enables communications among components of the system 100. The server 150 comprises a processor 152 in signal communication with a memory 158. Memory 158 stores software instructions 160 that when executed by the processor 152 cause the processor 152 to perform one or more functions described herein. For example, when the software instructions 160 are executed, the processor 152 executes a rule engine 154 to generate attribute-to-rule mapping tables 170 and detect unauthorized requests 104 to access resources 168 by analyzing the attribute-to-rule mapping tables 170. The entitlement database 120 stores entitlement tables 122 and rule tables 126 that provide information that may be used by the software instructions 160 and/or the processor 152. In other embodiments, system 100 may not have all of the components listed and/or may have other elements instead of, or in addition to, those listed above.

In general, system 100 (at the server 150) receives a request 104 from a user 102 to receive an entitlement 130 to access a particular resource 168. For example, assume that the user 102 is an employee of an organization 106, and sends the request 104 to the server 150 from the computing device 112. The particular resource 168 may comprise at least one of an application, a database, a computing system, or any other entity associated with the organization 106. The server 150 (via the rule engine 154) determines a set of entitlement attributes 162 from the request 104, where the set of entitlement attributes 162 comprises a set of user attributes 164 and a set of resource attributes 166. The set of user attributes 164 generally provides information about the user 102, such as employment status of the user 102 (e.g., active or terminated), a position of the user 102 in the organizational hierarchy, and authority level of the user 102 at the organization 106, among others. The set of resource attributes 166 generally provides information about the particular resource 168 that the user 102 is requesting to gain access to, such as a particular technology that the particular resource 168a provides (e.g., web development-related, information security-related, accounting-related, etc.), an identification indicator (e.g., a resource ID, a resource name), a type of permission (e.g., read-access, write-access, privileged-access, access to confidential information), among others. The rule engine 154 determines whether there is any rule 140 (in the rule tables 126) that is violated by the set of entitlement attributes 162. The rules 140 are generally put in place to indicate which users 102 are authorized to gain access to one or more resources 168 (i.e., permissive rules 140), and which users 102 are not authorized to gain access to one or more resources 168 (i.e., preventive rules 140). Each rule 140 is defined by a set of rule attributes 142 that describe conditions that need to be met by a user 102 so that the user 102 is determined to be eligible (or not eligible) to access a particular resource 168. The rule engine 154 compares rule attributes 142 (associated with rules 140) with the entitlement attributes 162, and determines whether each entitlement attribute 162 corresponds to its corresponding rule attribute 142. In response to determining that there is at least one rule 140 that is violated by the set of entitlement attributes 162, The rule engine 154 denies the request 104.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Computing device 112 is generally any device that is configured to process data and interact with users 102. Examples of computing device 112 include, but are not limited to, a personal computer, a desktop computer, a workstation, a server, a laptop, a tablet computer, a mobile phone (such as smartphones), etc. The computing device 112 may be associated with the organization 106. In a particular example, the computing device 112 may comprise a requesting system from which the user 102 sends a request 104 to gain access to a particular resource 168.

Entitlement database 120 generally comprises any storage architecture. Examples of the entitlement database 120, include, but are not limited to, a network-attached storage cloud, a storage area network, a storage assembly directly (or indirectly) coupled to one or more components of the system 100. The entitlement database 120 stores entitlement tables 122 and rule tables 126.

The entitlement tables 122 generally include entitlements 130 associated with resources 168 and/or users 102. The entitlement tables 122 may comprise any number of tables describing entitlements 130. In the illustrated example of FIG. 1, the entitlement tables 122 includes a first entitlement table 122a that is associated with a first resource 168a (e.g., an application, a database, a computing device, etc.). The entitlement table 122a comprises a plurality entitlements 130 that are granted to users 102 to allow users 102 to access the first resource 168a.

An entitlement 130 generally refers to an access right or permission provisioned to a particular user 102 to access a resource 168. Accordingly, provisioning access rights for a user 102 may include associating a resource 168 with an indication that the user 102 has permission to access that resource 168 such that the user 102 is entitled to access and capable of accessing the resource 168 associated with the indication. For example, when a user 102 joins an organization 106 as an employee, the system 100 (e.g., via the rule engine 154) uses information that describes the user 102 to provision particular entitlements 130 to the user 102 to gain access to various components of the organization 106, such as a human resource system, an email system, a payroll system, a finance system, application directories, and so on. For example, if the user 102 belongs to an accounting department of the organization 106, the user 102 is provisioned to hold an entitlement 130 to access one or more resources 168 that are used for accounting. Similarly, the rule engine 154 may also enforce a policy or a rule 140 to prevent non-finance employees from being provisioned to entitlements 130 to access accounting resources 168. When a user 102 receives an entitlement 130, corresponding login credentials may be created for the user 102. Provisioning access rights may also include assigning a particular role, user group, or task to a user 102. Revoking access rights may include removing associations with permissions, roles, user groups, and tasks. Entitlements 130 may be similarly provisioned for a resource 168 such that the resource 168 is entitled to access and capable of accessing other resources 168.

An entitlement 130 granted to a particular user 102 is defined by a set of entitlement attributes 132. The set of entitlement attributes 132 may comprise user attributes and resource attributes. The user attributes generally provide information about the user 102, such as employment status of the user 102 (e.g., active or terminated), a position of the user 102 in the organizational hierarchy (e.g., management in a finance department, a mid-level employee in a project development department, etc.), and authority level of the user 102 at the organization 106, among others. The resource attributes generally provide information about the resource 168 that the user 102 has access to, such as a particular technology that the resource 168 provides (e.g., web development-related, information security-related, accounting-related, etc.), an identification indicator (e.g., a resource ID, a resource name), a type of permission (e.g., read-access, write-access, privileged-access, access to confidential information, among others.

In the illustrated example of FIG. 1, the first entitlement 130a is associated with the first user 102a, and the first entitlement 130a is defined by the first set of entitlement attributes 132a. TABLE 1 illustrates an example of the first entitlement 130a defined by the first set of entitlement attributes 132a.

TABLE 1

Example first entitlement 130a defined by the first set of entitlement attributes 132a.

| | Entitlement attributes 132a | | | | |
|---|---|---|---|---|---|
| Entitle- | Employ- ment status 132a-1 | Position in organization hierarchy 132a-2 | Resource ID 132a-3 | Technology field 132a-4 | Type of permission 132a-5 |
| ment 130a | Active | manager of an information security team | 1234 | Information security- related technology | Write- access, read- access |

As illustrated in TABLE. 1, the first set of entitlement attributes 132a indicates that the first user 102a is an active employee and a manager of an information security team. The first set of entitlement attributes 132a further indicates that the first user 102a is provisioned to have write-access and read-access to an information security-related technology associated with the first resource 168a associated with resource ID 1234. In other examples, an entitlement 130 may include other entitlement attributes 132, such as timestamps of access to a resource 168, geographical locations from where the entitlement 130 is granted (or not denied), etc.

The rules table 126 generally includes rules 140 defined by a set of rule attributes 142. The rules 140 are put in place by the system 100 (e.g., via the rule engine 154) to allow authorized users 102 access to resources 168 that the authorized users 102 hold corresponding entitlements 130 to access (i.e., permissive rules 140), and deny unauthorized users 102 access to resources 168 that the unauthorized users 102 do not hold corresponding entitlements 130 to access (i.e., preventive rules 140). The grant column 148 indicates if a rule 140 is permissive or preventive. If a row in the grant column 148 indicates "Yes," it means that the rule 140 in that row is permissive, meaning that users 102 who satisfy conditions of that rule 140 are authorized to access resources 168 indicated by that rule 140. Similarly, if a row in the grant column 148 indicates "No," it means that the rule 140 in that row is preventive, meaning that users 102 who satisfy conditions of that rule 140 are not authorized to access resources 168 indicated in that rule 140.

The set of rule attributes 142 may include corresponding components of the set of entitlement attributes 132 described above. For example, the set of rule attributes 142 may comprise user attributes and resource attributes. For permissive rules 140, the user attributes may provide information about users 102 who are authorized to access one or more resources 168. For preventive rules 140, the user attributes may provide information about users 102 who are not authorized to access one or more resources 168. For example, the user attributes may include an employment status of users 102 (e.g., active or terminated), positions of the users 102 in the organizational hierarchy (e.g., management in a finance department, a mid-level employee in a project development department, etc.), and authority level of the users 102 at the organization 106, among others.

In another example, the resource attributes may include information about resources 168 that the users 102 can have access to (indicated in permissive rules 140), and cannot have access to (indicated in preventive rules 140). For example, the resource attributes may indicate a particular technology that a resource 168 provides (e.g., web development-related, information security-related, accounting-related, etc.), an identification indicator (e.g., a resource ID, a resource name), a type of permission (e.g., read-access, write-access, privileged-access, access to confidential information, among others. In the illustrated example, the first rule 140a is defined by the first set of rule attributes 142a. Table 2 illustrates an example of the first rule 140a defined by the first set of rule attributes 142a.

TABLE 2

Example first rule 140a defined by the first set of rule attributes 142a.

| Rule 140a | Rule attributes 142a | | | | | Grant 148 |
|---|---|---|---|---|---|---|
| | Employ- ment status 142a-1 | Position in organization hierarchy 142a-2 | Resource ID 142a-3 | Tech- nology field 142a-4 | Type of permission 142a-5 | Yes |
| | Active | A mid- level employee of an information security team | 5678 | Infor- mation security- related tech- nology | read- access | |

As illustrated in TABLE 2, the first rule 140a indicates that users 102 who are active employees and mid-level employees in information security teams can be authorized to have read-access to a information security-related technology provided by a resource 168 that is associated with a resource ID 5678.

As further illustrated in the example of FIG. 1, the second rule 140b is defined by the second set of rule attributes 142b, and the second rule 140b is a preventive rule 140 as indicated by "No" in the grant column 148. TABLE 3 illustrates an example of the second rule 140b.

TABLE 3

Example second rule 140b defined by the second set of rule attributes 142b.

| Rule 140b | Rule attributes 142b | | | | | Grant 148 |
|---|---|---|---|---|---|---|
| | Employ- ment status 142b-1 | Position in organization hierarchy 142b-2 | Resource ID 142b-3 | Tech- nology field 142b-4 | Type of permission 142b-5 | No |
| | Active | A manager of an information security team | 1357 | Finance- related tech- nology | read- access | |

As illustrated in TABLE 3, the second rule 140b indicates that users 102 who are active employees and managers in information security teams cannot be authorized to have read-access to a finance-related technology provided by a resource 168 that is associated with a resource ID 1357. In other examples, a rule 140 may include other rule attributes 142, such as timestamps of access to a resource 168, geographical locations from where the rule 140 indicates access to a resource 168 is granted (or not denied), etc.

In some cases, the rules 140 may be applied at different levels with respect to a resource 168. For example, a rule 140 may be defined at an organization or enterprise level, resource level, and technology field level. In one example, at an organization or enterprise level, a rule 140 may indicate that all users 102 who are no longer employees of the organization 106 (i.e., not active or terminated) are not authorized to access any resource 168. In another example, at a resource level, a rule 140 may indicate that users 102 who belong to a particular department, such as accounting, can be authorized to access a particular resource 168 that is used for accounting. In another example, at a technology field level, a rule 140 may indicate that users 102 who belong to the accounting group may not be authorized to have access to a first technology to be able to generate payment requests and a second technology to be able to approve payment requests.

The entitlement tables 122 and rule tables 126 are used by the rule engine 154 to detect violations in granted entitlements 130. For example, the rule engine 154 may periodically analyze the entitlement tables 122 and determine whether there is any entitlement 130 that violates at least one rule 140. The entitlement tables 122 and rule tables 126 are further used by the rule engine 154 to detect violations in access requests 104 from users 102 to hold entitlements 130 to access resources 168 that the users 102 are not authorized to access as indicated by the rules 140, i.e., verify requests 104 of users 103 to access resources 168. These processes are described in more detail in FIG. 2.

Server

Server 150 is generally a server or any other device configured to process data and communicate with computing devices (e.g., computing devices 112), databases (e.g., entitlement database 120), and resources 168 via the network 110. In one example, server 150 may be a backend server 150 associated with the organization 106. The server 150 is generally configured to oversee operations of the processor 152 as described further below.

Processor 152 comprises one or more processors operably coupled to the memory 158. The processor 152 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations, processor 152 registers the supply operands to the ALU and store the results of ALU operations, and a control unit that fetches instructions from memory 158 and executes them by directing the coordinated operations of the ALU, registers and other components. The one or more processors are configured to implement various instructions. For example, the one or more processors are configured to execute instructions (e.g., software instructions 160) to implement the rule engine 154. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-3. For example, the processor 152 may be configured to perform one or more steps of method 300 as described in FIG. 3.

Network interface 156 is configured to enable wired and/or wireless communications (e.g., via network 110). The network interface 156 is configured to communicate data between the server 150 and other devices (e.g., computing devices 112), databases (e.g., entitlement database 120), and resources 168, etc. For example, the network interface 156 may comprise a WIFI interface, a local area network (LAN) interface, a wide area network (WAN) interface, a modem, a switch, or a router. The processor 152 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. Memory 158 is operable to store the request 104, software instructions 160, attribute-to-rule mapping tables 170, and/or any other data or instructions. The software instructions 160 may comprise any suitable set of instructions, logic, rules, or code operable to execute the processor 152.

Rule Engine

Rule engine 154 may be implemented by the processor 152 executing the software instructions 160, and is generally configured to verify requests 104 of users 103 to access resources 168, and violations in entitlements 130 that are granted to users 102 who are not authorized to hold entitlements 130 to access particular resources 168 based on the rules 140 and attribute-to-rule mapping tables 170. To this end, the rule engine 154 generates the attribute-to-rule mapping tables 170. In one embodiment, the rule engine 154 may generate the attribute-to-rule mapping tables 170 by implementing an Object-Oriented Programming (OOP).

In this process, the rule engine 154 may define each component in the rule tables 126 as an object, and determine relationships and associations between the components of the rules tables 126, where the components of the rule tables 126 may include the rule attributes 142 and indications in the grant column 148. For example, the rule engine 154 may generate attribute-to-rule mapping tables 170 in which the rules 140 are classified into different condition classes 172 with respect to various rule attributes 142a to 142n.

In the illustrated example in FIG. 1, the rule engine 154 generates the attribute-to-rule mapping table 170a to 170n, which, respectively, include classifications of rules 140 with respect to rule attributes 142-1 to 142-n which may include any of the rule attributes 142 described above. For example, in the first attribute-to-rule mapping table 170a, the rules 140 are classified with respect to the first rule attribute 142-1. For example, assume that the first rule attribute 142-1 indicates the employment status of employees. Also assume that the first condition class 172a-1 indicates active employees or users 102, and the second condition class 172a-2 indicates terminated employees or users 102. In the example of FIG. 1, the first attribute-to-rule mapping table 170a indicates that the first rule 140a belongs to the first condition class 172a-1 and rules 140b-d belong to the second condition class 172a-2. In other words, the first attribute-to-rule mapping table 170a indicates that the first rule 140a is related to active employees, and rules 140b-d are related to terminated employees.

In another example, in the attribute-to-rule mapping table 170n, the rules 140 are classified with respect to the rule attribute 142-n. For example, assume that the rule attribute 142-n indicates a type of permission to a resource 168, such as read-access, write-access, and other types of permissions described above. Also, assume that the first condition class 172n-1 indicates a read-access, and the second condition class 172n-2 indicates write-access. Also, assume that the rules 140 shown in the attribute-to-rule mapping table 170n are preventive rules 140. In the example of FIG. 1, the attribute-to-rule mapping table 170n indicates that rule 140d belongs to the first condition class 172n-1, and rules 140a, 140b, and 140c belong to the second condition class 172n-2. In other words, the attribute-to-rule mapping table 170n indicates that rule 140d is defined so that users 102 can not be authorized to gain read-access to a resource 168 indicated in the rules 140d, and rules 140a, 140b, and 140c are defined so that users 102 can not be authorized to gain write-access to resources 168 indicated in the rules 140a, 140b, and 140c. In other examples, the attribute-to-rule mapping tables 170 may be shown in any other configuration. For example, any number of rules 140 may be classified in any number of condition classes 172. The attribute-to-rule mapping tables 170 are used by the rule engine 154 to detect violations in requests 104 and entitlements 130 as described in an operational flow 200 of FIG. 2, as described below.

Operational Flow

The operational flow of the rule engine 154 begins when a user 102 sends a request 104 to receive an entitlement 130 to gain access to a particular resource 168, such as resource 168a or a particular technology provided by the resource 168a. From the request 104, the rule engine 154 determines or extracts a set of entitlement attributes 162, where the set of entitlement attributes 162 provides information about the user 102 (i.e., user attributes 164) and the resource 168a (i.e., resource attributes 166). For example, the request 104 may implement object-oriented programming implemented in the software instructions 160 to determine or extract the set of entitlement attributes 162 from the request 104. In this process, the rule engine 154 may determine the identity of the user 102 from the request 104 and fetch the user attributes 164 from the entitlement table 122 stored in the entitlement database 120. The user attributes 164, for example, may include the employment status of the user 102, a position of the user 102 in the organizational hierarchy, and authority level of the user 102 at the organization 106, among others. The resource attributes 166, for example, may include a particular technology that the resource 168a provides (e.g., web development-related, information security-related, accounting-related, etc.), an identification indicator (e.g., a resource ID, a resource name), a type of permission (e.g., read-access, write-access, privileged-access, access to confidential information), among others.

The rule engine 154 determines whether there is any rule 140 in the rule tables 126 that is violated by the entitlement attributes 162 extracted from the request 104. To this end, the rule engine 154 may use the attribute-to-rule mapping tables 170. In this process, the rule engine 154 cross-references the extracted entitlement attributes 162 with the attribute-to-rule mapping tables 170 at one step so that the rule engine 154 does not need to cross-reference each component in the extracted attributes 162 against the entire rule tables 126. In this way, the cyclomatic complexity of this process can be reduced to Order of (n) or O(n), where n is the number of components of entitlement attributes 162 extracted from the request 104. For example, if there are five components in the extracted entitlement attributes 162, the rule engine 154 searches for rules 140 in the attribute-to-rule mapping tables 170 that have conditions on the five components of the extracted entitlement attributes 162. This process is described in more detail in an example operational flow 200 of the system 100 with respect to a particular example of a request 104 in FIG. 2.

Determining Whether an Example Access Request Violates any Rule

Figure 2:
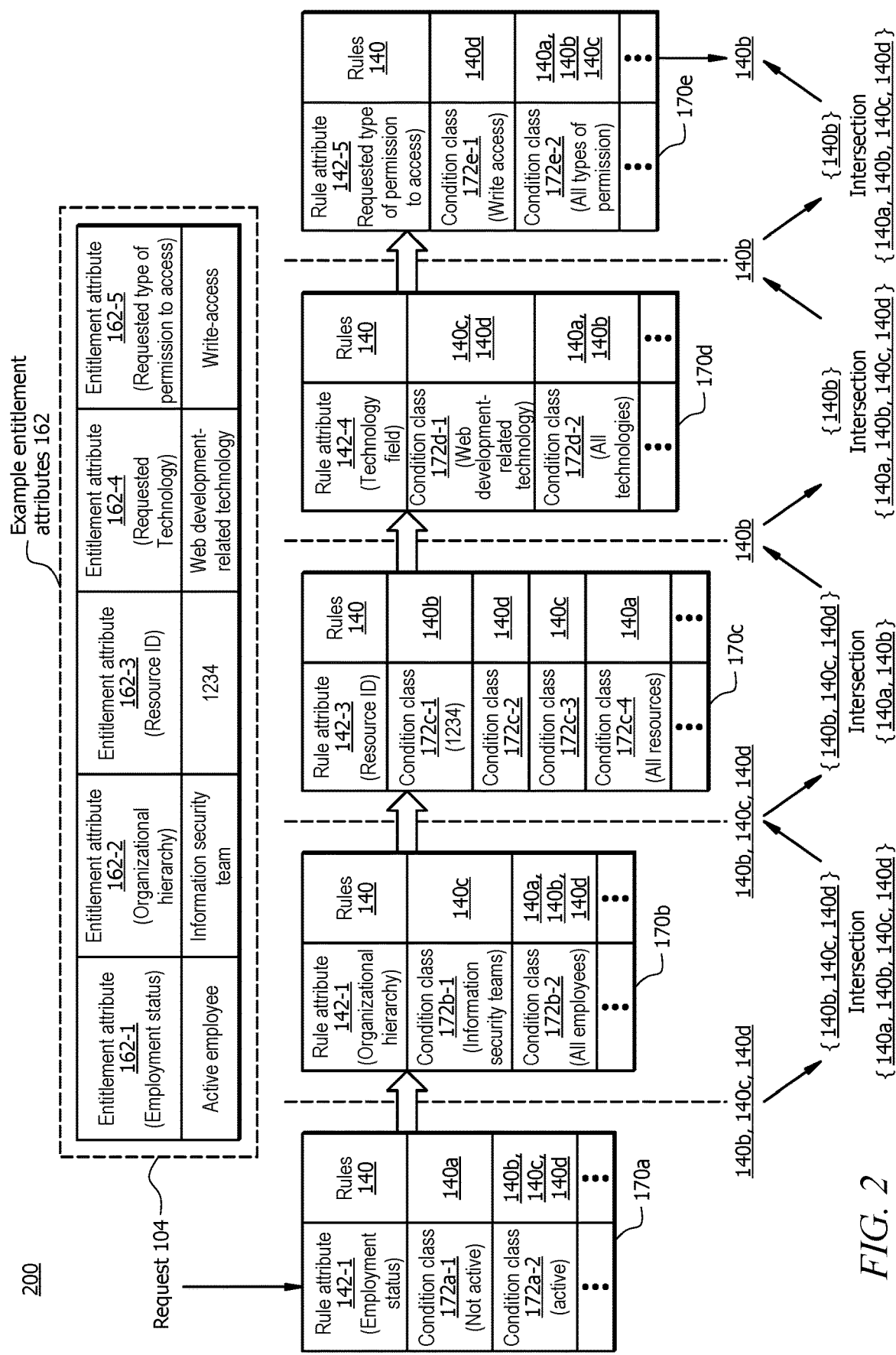
FIG. 2 illustrates an example operational flow of the system of FIG. 1 with respect to an exemplary access request.

FIG. 2 illustrates an example operational flow 200 of system 100 (of FIG. 1) for determining whether there is any rule 140 that is violated by the entitlement attributes 162 extracted from the particular example of the request 104 using the attribute-to-rule mapping tables 170. In the example of operational flow 200, the extracted entitlement attributes 162 from the particular example of the request 104 includes five entitlement attributes 162, including entitlement attributes 162-1 to 162-5. For example, assume that the entitlement attributes 162 state that the user 102 is an active employee (as indicated in the entitlement attribute 162-1), belongs to an information security team (as indicated in the entitlement attribute 162-2), requests to have a write-access (indicated in the entitlement attribute 162-5) to a web development-related technology (as indicated in the entitlement attribute 162-4) of a resource 168 with a resource ID of 1234 (as indicated in the entitlement attribute 162-3).

The rule engine 154 determines corresponding rules 140 that have conditions on the entitlement attributes 162 from the attribute-to-rule mapping tables 170. In this particular example, the rule engine 154 determines rules 140 that have rule attributes 142 that have conditions on employment status (rule attribute 142-1), organizational hierarchy (rule attribute 142-2), resource ID (rule attribute 142-3), technology field of resources 168 (rule attribute 142-4), and types of permission to access to resources 168 (rule attribute 142-5).

The rule engine 154 filters rules 140 based on corresponding condition classes 172 that they belong to in each of the attribute-to-rule mapping tables 170. With respect to the attribute-to-rule mapping table 170a, the rule engine 154 determines that rules 140b, 140c, and 140d belong to the condition class 172a-2 that is related to active employees. Thus, the rule engine 154 filters the rules 140 down to rules 140b, 140c, and 140d that may be violated if the request 104 is granted.

With respect to the attribute-to-rule mapping table 170b, the rule engine 154 determines that rule 140c belongs to class condition 172b-1 that is related to users 102 in information security teams, and rules 140a, 140b, and 140d belong to the class 172b-2 that is related to all users 102. Thus, the rule engine 154 determines an intersection of results from filtering using the attribute-to-rule mapping table 170a (i.e., rules 140b, 140c, and 140d) with rules 140a, 140b, 140c, and 140d, which is 140a, 140b, and 140d.

With respect to the attribute-to-rule mapping table 170c, the rule engine 154 determines that rule 140b belongs to condition class 172c-1 that is related to a resource 168 with a 1234 resource ID, and rule 140a belongs to condition class 172c-4 that is related to all resources 168. Thus, the rule engine 154 determines an intersection of results from the attribute-to-rule mapping table 170b (i.e., rules 140b, 140c, and 140d) with rules 140a and 140b, which is rule 140b. With respect to the attribute-to-rule mapping table 170d, the rule engine 154 determines that rules 140c and 140d belong to class condition 172*d*-1 that is related to web development-related technologies, and rules 140*a* and 140*b* belong to class condition 172*d*-2 that is related to all technologies. Thus, the rule engine 154 determines an intersection of results from the attribute-to-rule mapping table 170*c* (i.e., rule 140*b*) with rules 140*a*, 140*b*, 140*c*, and 140*d*, which is rule 140*b*.

With respect to the attribute-to-rule mapping table 170*e*, the rule engine 154 determines that rule 140*d* belongs to class condition 172*e*-1 that is related to write-access requests, and rules 140*a*, 140*b*, and 140*c* belong to class condition 172*e*-2 that is related to all types of permission to access resources 168. Thus, the rule engine 154 determines an intersection of results from the attribute-to-rule mapping table 170*d* (i.e., rule 140*b*) with rules 140*a*, 140*b*, 140*c*, and 140*d*, which is rule 140*b*. Thus, the rule engine 154 denies the request 104. In this way, the rule engine 154, in one step or one loop, determines that rule 140*b* is violated if the particular example of request 104 is granted, as supposed to cross-referencing each rule 140 against each of the entitlement attributes 162. In another example, if the rule engine 154 does not find any rule 140 by the end of the operational flow 200, the rule engine 154 determines that there is no rule 140 that is violated by the request 104, and grants the request 104.

The example of FIG. 2 is not meant to limit the scope of the invention which has been set forth in this disclosure. Although FIG. 2 illustrates an example request 104 with five entitlement attributes 162, it is understood that a request 104 may include any suitable number of entitlement attributes 162. It is also understood that the attribute-to-rule mapping tables 170 may include any number of mapping tables 170.

Referring back to FIG. 1. the rule engine 154 may follow the example operational flow 200 (see FIG. 2) to detect violations in granted entitlements 130 that are stored in the entitlement database 120. For example, the rule engine 154 may periodically (e.g., every week, every few weeks, or any other suitable interval) review and analyze the granted entitlements 130 using the operational flow 200 (see FIG. 2) to determine whether there is any entitlement 130 that violates one or more rules 140. If the rule engine 154 detects that there is any entitlement 130 that violates one or more rules 140, the rule engine 154 revokes that entitlement 130.

In one embodiment, the rule engine 154 may configure the periodic review and analysis of the entitlements 130 based on historical analysis reports. For example, if the rule engine 154 detects that above a threshold number of entitlements 130 (e.g., 20% of the total entitlements 130) of a particular user 102 have been revoked in above a threshold number of historical analysis reports (e.g., above 60%), the rule engine 154 may decrease the interval for performing the periodic analysis of the entitlements 130 of the particular user 102 to an interval adjusted based on the revoked threshold number of entitlements 130 and the threshold number of historical analysis reports. As such, the rule engine 154 may detect and revoke unauthorized access rights or entitlements 130.

In one embodiment, the rule engine 154 may be configured to determine the severity of security threat that an access request 104 poses based on a number of rules 140 that the access request 104 violates. For example, if the access request 104 violates above a threshold number of rules 140 (e.g., five, ten, or any appropriate number of rules 140), the rule engine 154 determines that the access request 104 poses a high-security threat. In such cases, in addition to not granting the access request 104, the rule engine 154 may be configured to take additional measures, such as sending a notifying message to the user 102 who has requested the access request 104 indicating that the access request 104 poses a high-security threat, sending a notifying message to dedicated authorities indicating that the access request 104 poses a high-security threat, verifying other entitlements 130 of the user 102, reducing the interval for performing the periodic analysis of the entitlements 130 of the user 102, among others.

Example Method of Verifying an Access Request

Figure 3:
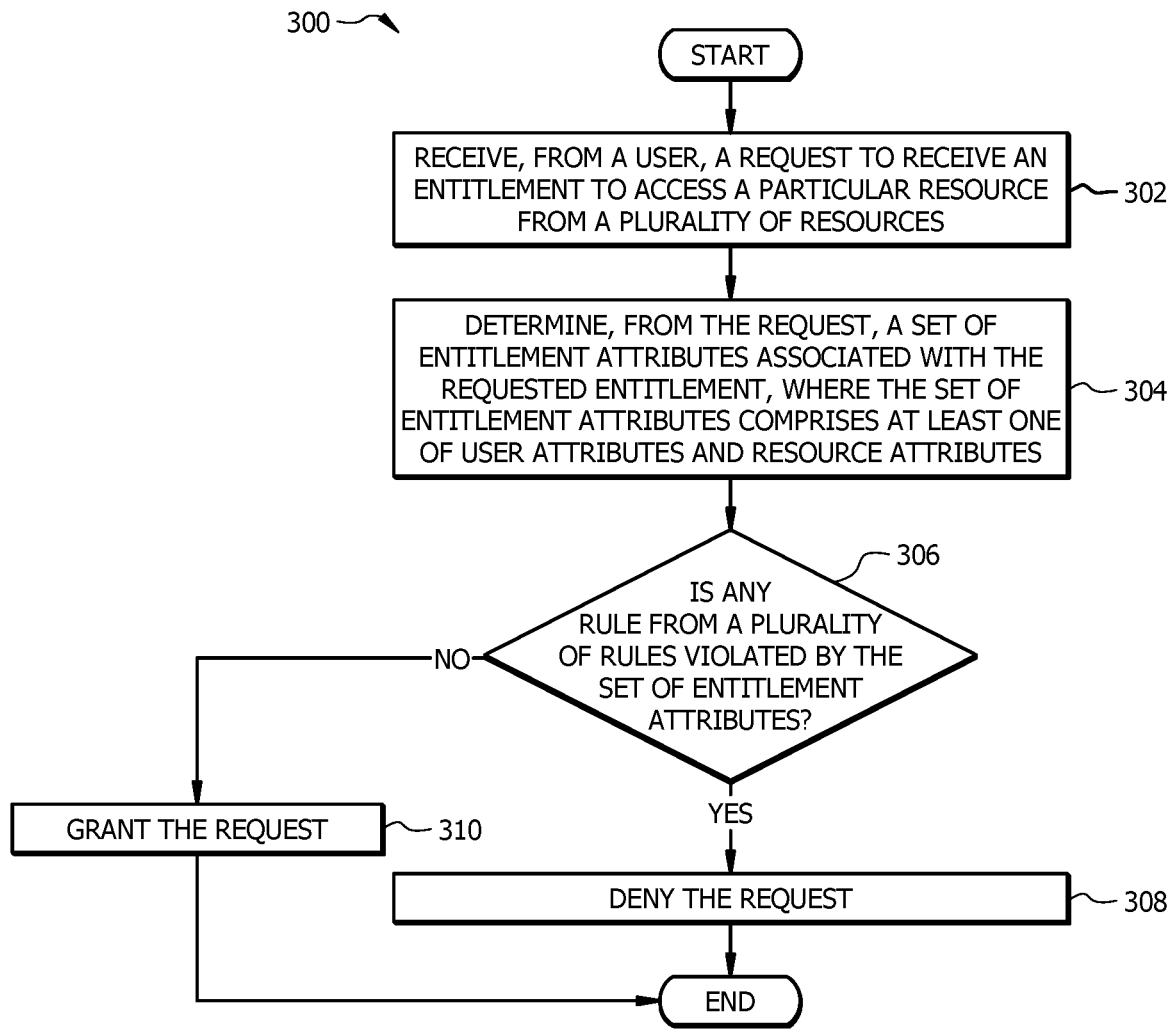
FIG. 3 illustrates an example flowchart of a method for verifying access requests.

FIG. 3 illustrates an example flowchart of a method 300 for verifying a request 104 received from a user 102 for accessing a resource 168. Modifications, additions, or omissions may be made to method 300. Method 300 may include more, fewer, or other steps. For example, steps may be performed in parallel or any suitable order. While at times discussed as the system 100, server 150, processor 152, rule engine 154, or components of any of thereof performing steps, any suitable system or components of the system may perform one or more steps of the method 300. For example, on or more steps of method 300 may be implemented, at least in part, in the form of software instructions 160 of FIG. 1, stored on non-transitory, tangible, machine-readable media (e.g., memory 158 of FIG. 1) that when run by one or more processors (e.g., processor 152 of FIG. 1) may cause the one or more processors to perform steps 302-310.

Method 300 begins at step 302 where the rule engine 154 receives, from a user 102, a request 104 to receive an entitlement 130 to access a particular resource 168 from a plurality of resources 168 within an organization 106. For example, the rule engine 154 receives the request 104 when the user 102 communicates the request 104 to the server 150 using the computing device 112 via network 110. For example, the particular resource 168 may include at least one of an application, a database, and a computing device associated with the organization 106.

At step 304, the rule engine 154 determines, from the request 104, a set of entitlement attributes 162 associated with the requested entitlement 130, where the set of entitlement attributes 162 comprises at least one of user attributes 164 and resource attributes 166. For example, the rule engine 154 may determine or extract the set of entitlement attributes 162 from the request 104 using object-oriented programming implemented in the software instructions 160, similar to that described in FIGS. 1 and 2. The user attributes 164 may include the employment status of the user 102, a position of the user 102 in the organizational hierarchy, and authority level of the user 102 at the organization 106, among others. The resource attributes 166 may include a particular technology that the resource 168*a* provides (e.g., web development-related, information security-related, accounting-related, etc.), an identification indicator (e.g., a resource ID, a resource name), a type of permission (e.g., read-access, write-access, privileged-access, access to confidential information), among others.

At step 308, the rule engine 154 determines whether there is any rule 140 from a plurality of rules 140 that is violated by the set of entitlement attributes 162. The rule engine 154 may use the attribute-to-rule mapping tables 170 to determine whether there is any rule 140 from a plurality of rules 140 that is violated by the set of entitlement attributes 162, similar to that described in FIGS. 1 and 2. For example, the rule engine 154 may follow the operational flow 200 described in FIG. 2 to filter rules 140 that violate the set of entitlement attributes 162 (assuming that the rules 140 are preventive rules 140).

In this process, the rule engine 154 may compare each entitlement attribute 162 with its corresponding rule attribute 142 indicated by the rules 140, and determine whether each entitlement attribute 162 corresponds to its corresponding rule attribute 142. In other words, the rule engine 154 determines whether each entitlement attribute 162 belongs to the same condition class 172 as its corresponding rule attribute 142. If the rule engine 154 determines that each entitlement attribute 162 belongs to a condition class 172 that its corresponding rule attribute 142 belongs to, the rule engine 154 indicates that the rules 140 that belong to the same condition class 172 as the entitlement attribute 162 may violate the request 104.

Referring back to FIG. 2, for example, with respect to the attribute-to-rule mapping table 170a, the rule engine 154 determines that the entitlement attribute 162-1 and its corresponding rule attribute 142-1 belong to the condition class 172a-2 that is related to active employees. Thus, the rule engine 154 filters the rules 140b, 140c, and 140d as rules 140 that may violate the request 104. Referring to FIG. 3, the rule engine 154 performs a similar procedure for other entitlement attributes 162, as described in FIG. 2. If it is determined that there is at least one rule 140 that is violated by the set of entitlement attributes 162, method 300 proceeds to step 308, where the rule engine 154 denies the request 104. Otherwise, method 300 proceeds to step 310, where the rule engine 154 grants the request 104.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements 118 or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for verifying a request from a user, comprising:
 a memory operable to store one or more rules to be satisfied in order to gain access to a plurality of resources, wherein:
  the plurality of resources comprises at least one of an application, a database, and a computing device associated with an organization;
  each rule of the one or more rules comprises a set of rule attributes indicating conditions to be met by the user so that the user is determined to be eligible to receive an entitlement to access a resource from the plurality of resources;
  each rule of the one or more rules is classified into a condition class of a plurality of condition classes; and
  the plurality of condition classes comprises a first condition class and a second condition class; and
 a processor, operably coupled with the memory, and configured to:
  receive, from the user, a request to receive an entitlement to access a particular resource from the plurality of resources;
  determine, from the request, a set of entitlement attributes associated with the entitlement indicating a type of permission to access the particular resource, wherein the type of permission comprises at least one of a write-access and a read-access to the particular resource;
  determine a first plurality of rules associated with the first condition class;
  determine a second plurality of rules associated with the second condition class;
  determine, starting at the first condition class and proceeding to the second condition class, whether there is any rule from the first plurality of rules associated with the first condition class and the second plurality of rules associated with the second condition class that is violated by the set of entitlement attributes; and
  in response to determining that there is at least one rule that is violated by the set of entitlement attributes, deny the request.

2. The system of claim 1, wherein the processor is further configured to, in response to determining that no rule from the first plurality of rules and the second plurality of rules is violated by the set of entitlement attributes, grant the request.

3. The system of claim 1, wherein:
 the set of entitlement attributes comprise a set of user attributes; and
 the set of user attributes comprises at least one of an employment status of the user and an authority level of the user at the organization.

4. The system of claim 1, wherein:
 the set of entitlement attributes comprises a set of resource attributes; and
 the set of resource attributes comprises at least one of a geographical location from where the request is initiated and an identification indicator associated with the particular resource.

5. The system of claim 1, wherein the processor is further configured to generate a plurality of attribute-to-rule mapping tables that indicate associations between the one or more rules and the set of rule attributes, the plurality of attribute-to-rule mapping tables comprises:
 a first attribute-to-rule mapping table that indicates relationships between a first attribute and the first plurality of rules, such that each rule from the first plurality of rules is classified into a corresponding condition class indicated by the first attribute; and
 a second attribute-to-rule mapping table that indicates relationships between a second attribute and the second plurality of rules, such that each rule from the second plurality of rules is classified into a corresponding condition class indicated by the second attribute.

6. The system of claim 1, wherein determining whether there is any rule from the first plurality of rules or the second plurality of rules that is violated by the set of entitlement attributes comprises:
for each entitlement attribute from the set of entitlement attributes:
comparing a entitlement attribute with a corresponding rule attribute from the set of rule attributes; and
determining whether the entitlement attribute corresponds with the corresponding rule attribute; and
in response to determining that the set of entitlement attributes corresponds with the set of rule attributes:
determining that the request does not violate any rule from the first plurality of rules and the second plurality of rules; and
granting the request.

7. The system of claim 6, wherein determining whether there is any rule from the first plurality of rules and the second plurality of rules that is violated by the set of entitlement attributes further comprises in response to determining that there is at least one entitlement attribute from the set of entitlement attributes that does not correspond with a corresponding rule attribute from the set of rule attributes:
determining that the request violates at least one rule from the first plurality of rules or the second plurality of rules; and
denying the request.

8. A method for verifying a request from a user, comprising:
receiving, from the user, a request to receive an entitlement to access a particular resource from a plurality of resources, wherein the plurality of resources comprises at least one of an application, a database, and a computing device associated with an organization;
determining, from the request, a set of entitlement attributes associated with the entitlement indicating a type of permission to access the particular resource, wherein the type of permission comprises at least one of a write-access and a read-access to the particular resource;
determine a first plurality of rules associated with a first condition class;
determine a second plurality of rules associated with a second condition class;
determining, starting at the first condition class and proceeding to the second condition class, whether there is any rule from the first plurality of rules associated with the first condition class and the second plurality of rules associated with the second condition class that is violated by the set of entitlement attributes, wherein:
each rule of the first plurality of rules and the second plurality of rules comprises a set of rule attributes indicating conditions to be met by the user so that the user is determined to be eligible to receive an entitlement to access a resource from the plurality of resources;
each rule of the first plurality of rules and the second plurality of rules is classified into a corresponding condition class of a plurality of condition classes; and
the plurality of condition classes comprise the first condition class and the second condition class; and
in response to determining that there is at least one rule that is violated by the set of entitlement attributes, denying the request.

9. The method of claim 8, further comprising, in response to determining that no rule from the first plurality of rules and the second plurality of rules is violated by the set of entitlement attributes, granting the request.

10. The method of claim 8, wherein:
the set of entitlement attributes comprise a set of user attributes; and
the set of user attributes comprises at least one of an employment status of the user and an authority level of the user at the organization.

11. The method of claim 8, wherein:
the set of entitlement attributes comprises a set of resource attributes; and
the set of resource attributes comprises at least one of a geographical location from where the request is initiated and an identification indicator associated with the particular resource.

12. The method of claim 8, further comprising generating a plurality of attribute-to-rule mapping tables that indicate associations between one or more of the first plurality of rules or the second plurality of rules and the set of rule attributes, the plurality of attribute-to-rule mapping tables comprises:
a first attribute-to-rule mapping table that indicates relationships between a first attribute and the first plurality of rules, such that each rule from the first plurality of rules is classified into the corresponding condition class indicated by the first attribute; and
a second attribute-to-rule mapping table that indicates relationships between a second attribute and the second plurality of rules, such that each rule from the second plurality of rules is classified into the corresponding condition class indicated by the second attribute.

13. The method of claim 8, wherein determining whether there is any rule from the first plurality of rules or the second plurality of rules that is violated by the set of entitlement attributes comprises:
for each entitlement attribute from the set of entitlement attributes:
comparing a entitlement attribute with a corresponding rule attribute from the set of rule attributes; and
determining whether the entitlement attribute corresponds with the corresponding rule attribute; and
in response to determining that the set of entitlement attributes corresponds with the set of rule attributes:
determining that the request does not violate any rule from the first plurality of rules and the second plurality of rules; and
granting the request.

14. The method of claim 13, wherein determining whether there is any rule from the first plurality of rules or the second plurality of rules that is violated by the set of entitlement attributes further comprises in response to determining that there is at least one entitlement attribute from the set of entitlement attributes that does not correspond with a corresponding rule attribute from the set of rule attributes:
determining that the request violates at least one rule from the first plurality of rules or the second plurality of rules; and
denying the request.

15. A non-transitory computer-readable medium storing instructions that when executed by a processor cause the processor to:
receive, from a user, a request to receive an entitlement to access a particular resource from a plurality of resources, wherein the plurality of resources comprises at least one of an application, a database, and a computing device associated with an organization;

determine, from the request, a set of entitlement attributes associated with the entitlement indicating a type of permission to access the particular resource, wherein the type of permission comprises at least one of a write-access and a read-access to the particular resource;

determine a first plurality of rules associated with a first condition class;

determine a second plurality of rules associated with a second condition class;

determine, starting at the first condition class and proceeding to the second condition class, whether there is any rule from the first plurality of rules associated with the first condition class and the second plurality of rules associated with the second condition class that is violated by the set of entitlement attributes, wherein:

each rule of the first plurality of rules and the second plurality of rules comprises a set of rule attributes indicating conditions to be met by the user so that the user is determined to be eligible to receive an entitlement to access a resource from the plurality of resources;

each rule of the first plurality of rules and the second plurality of rules is classified into a corresponding condition class of a plurality of condition classes; and the plurality of condition classes comprise the first condition class and the second condition class; and in response to determining that there is at least one rule that is violated by the set of entitlement attributes, deny the request.

16. The non-transitory computer-readable medium of claim 15, wherein the instructions when executed by the processor, further cause the processor to grant the request, in response to determining that no rule from the first plurality of rules and the second plurality of rules is violated by the set of entitlement attributes, granting the request.

17. The non-transitory computer-readable medium of claim 15, wherein:

the set of entitlement attributes comprise a set of user attributes; and the set of user attributes comprises at least one of an employment status of the user and an authority level of the user at the organization.

18. The non-transitory computer-readable medium of claim 15, wherein:

the set of entitlement attributes comprises a set of resource attributes; and the set of resource attributes comprises at least one of a geographical location from where the request is initiated and an identification indicator associated with the particular resource.

19. The non-transitory computer-readable medium of claim 15, wherein the instructions when executed by the processor, further cause the processor to generate a plurality of attribute-to-rule mapping tables that indicate associations between one or more of the first plurality of rules or the second plurality of rules and the set of rule attributes, the plurality of attribute-to-rule mapping tables comprises:

a first attribute-to-rule mapping table that indicates relationships between a first attribute and the first plurality of rules, such that each rule from the first plurality of rules is classified into a corresponding condition class indicated by the first attribute; and a second attribute-to-rule mapping table that indicates relationships between a second attribute and the second plurality of rules, such that each rule from the second plurality of rules is classified into a corresponding condition class indicated by the second attribute.

20. The non-transitory computer-readable medium of claim 15, wherein determining whether there is any rule from the first plurality of rules or the second plurality of rules that is violated by the set of entitlement attributes comprises:

for each entitlement attribute from the set of entitlement attributes:

comparing a entitlement attribute with a corresponding rule attribute from the set of rule attributes; and determining whether the entitlement attribute corresponds with the corresponding rule attribute; and in response to determining that the set of entitlement attributes corresponds with the set of rule attributes:

determining that the request does not violate any rule from the first plurality of rules and the second plurality of rules; and granting the request.

* * * * *